United States Patent [19]

Beicht et al.

[11] Patent Number: 4,995,433
[45] Date of Patent: Feb. 26, 1991

[54] FUEL DISPENSER SEAL

[75] Inventors: Bernd Beicht, Gross Umstadt OT Rischen; Joachim Heinemann, Weinheim; Frank Keller, Heddesheim; Reinhard Tinz, Gross Biberau, all of Fed. Rep. of Germany

[73] Assignee: Firma Carl Freudenberg, Weinheim, Fed. Rep. of Germany

[21] Appl. No.: 387,014

[22] Filed: Jul. 28, 1989

[30] Foreign Application Priority Data

Sep. 3, 1988 [DE] Fed. Rep. of Germany ....... 3829948

[51] Int. Cl.$^5$ ............................................... B65B 3/04
[52] U.S. Cl. ..................................... 141/312; 141/44; 141/285; 220/86 R; 137/587
[58] Field of Search ...................... 141/44, 312, 311 R, 141/389, 386, 390, 285, 348; 220/85 R, 86 R, 85 VR, 85 VS; 137/587-589

[56] References Cited

U.S. PATENT DOCUMENTS

| 3,911,977 | 10/1975 | Berger | 141/348 |
| 3,912,117 | 10/1975 | Ryding | 220/86 R X |
| 3,942,564 | 3/1976 | Nakazato | 141/348 |
| 4,034,784 | 7/1977 | Ball et al. | 141/348 |
| 4,630,749 | 12/1986 | Armstrong et al. | 220/86 R |
| 4,702,386 | 10/1987 | Boehmer et al. | 220/86 R |
| 4,715,509 | 12/1987 | Ito et al. | 220/86 R |
| 4,741,369 | 5/1988 | Dawson | 141/286 |
| 4,762,247 | 8/1988 | Temmesfeld | 220/86 R X |
| 4,770,677 | 9/1988 | Harris | 141/286 X |
| 4,798,306 | 1/1989 | Giacomazzi et al. | 220/86 R |

FOREIGN PATENT DOCUMENTS

| 2436221 | 2/1975 | Fed. Rep. of Germany | 141/312 |
| 3641274 | 6/1987 | Fed. Rep. of Germany | . |
| 87108593 | 11/1987 | Fed. Rep. of Germany | . |

Primary Examiner—Ernest G. Cusick
Attorney, Agent, or Firm—Felfe & Lynch

[57] ABSTRACT

A fuel dispenser seal to be used in an inlet of a fuel tank having an orifice of a reduced diameter. The seal comprises a sealing ring made of a polymer material which is provided with a sealing lip which can engage with the fuel dispenser. The sealing ring is held in a support body of a basically tube-like shape and in at least a partial section the support body is elastically configured and can be inserted into the inlet through orifice by a reversible diameter reduction. In the inlet it can engage with a projection of the inlet facing in radial direction towards the interior and it can be firmly attached in axial direction.

12 Claims, 3 Drawing Sheets

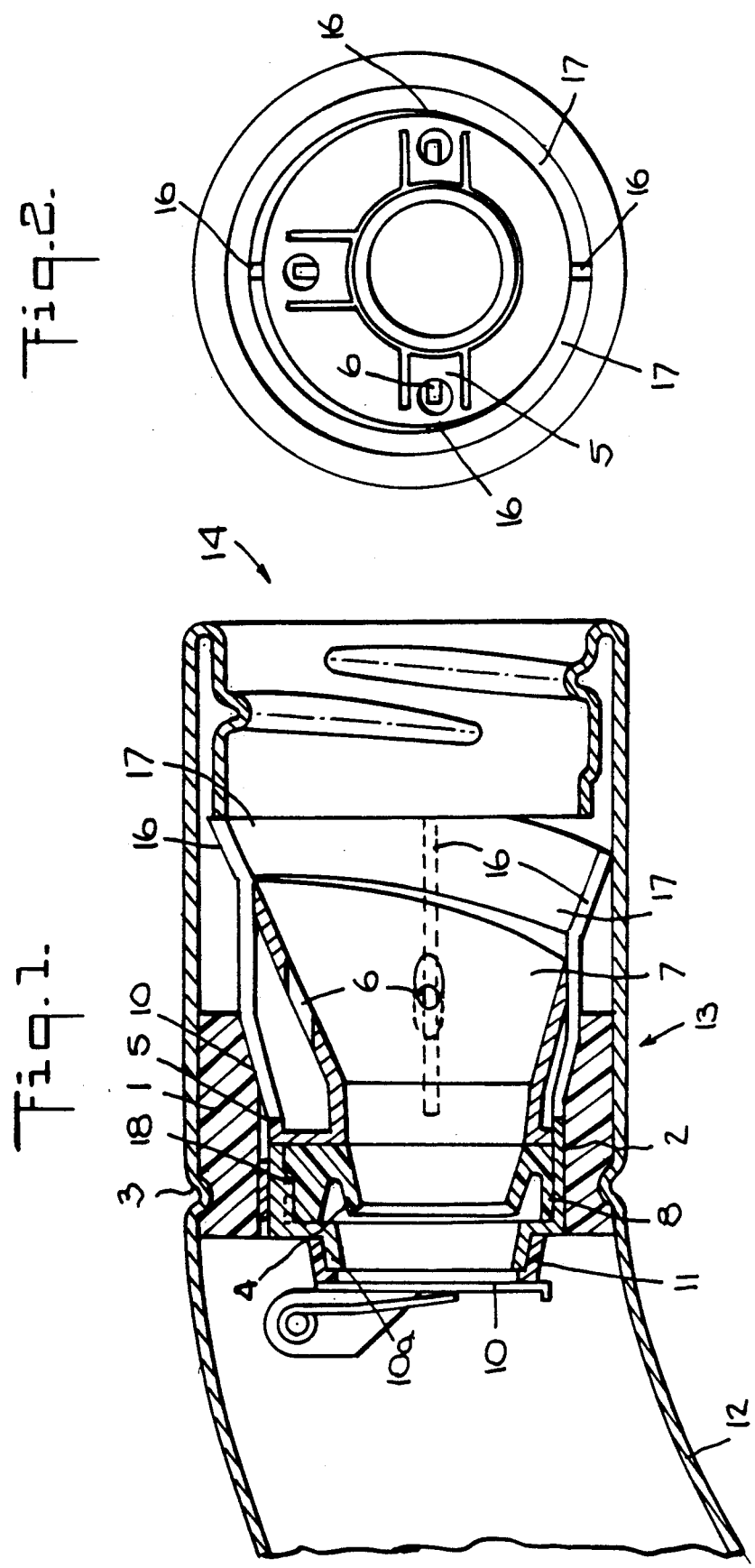

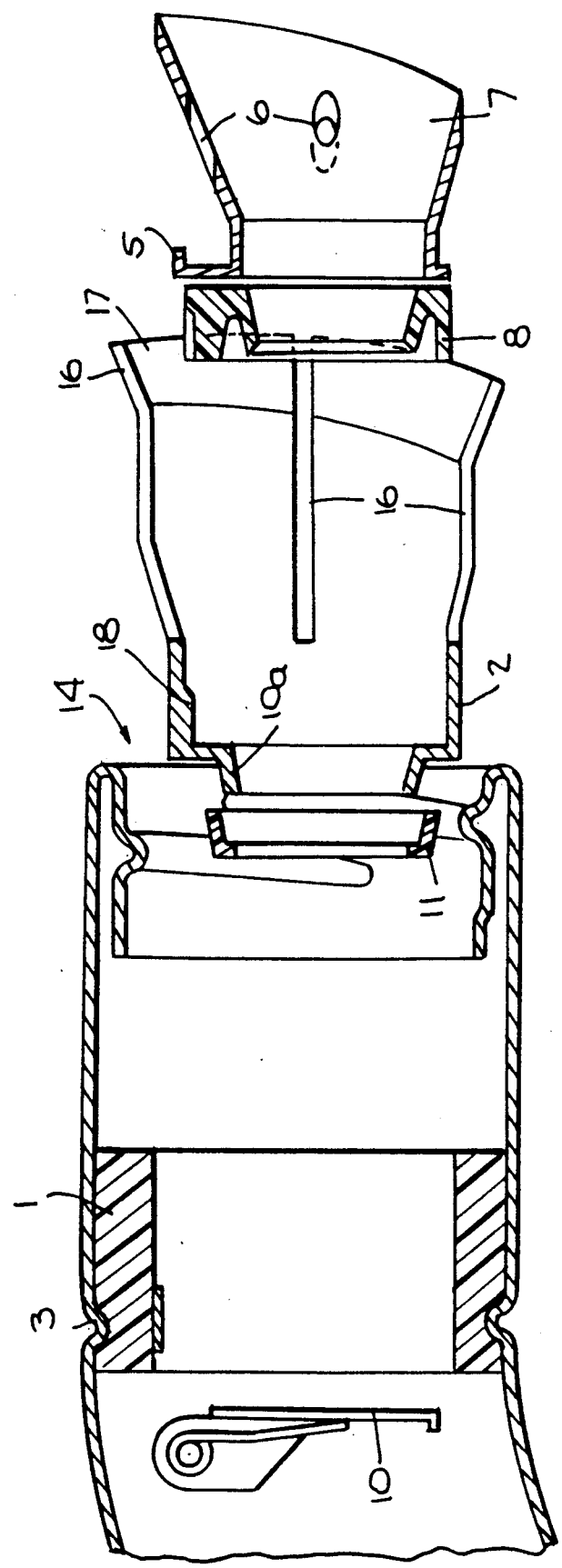

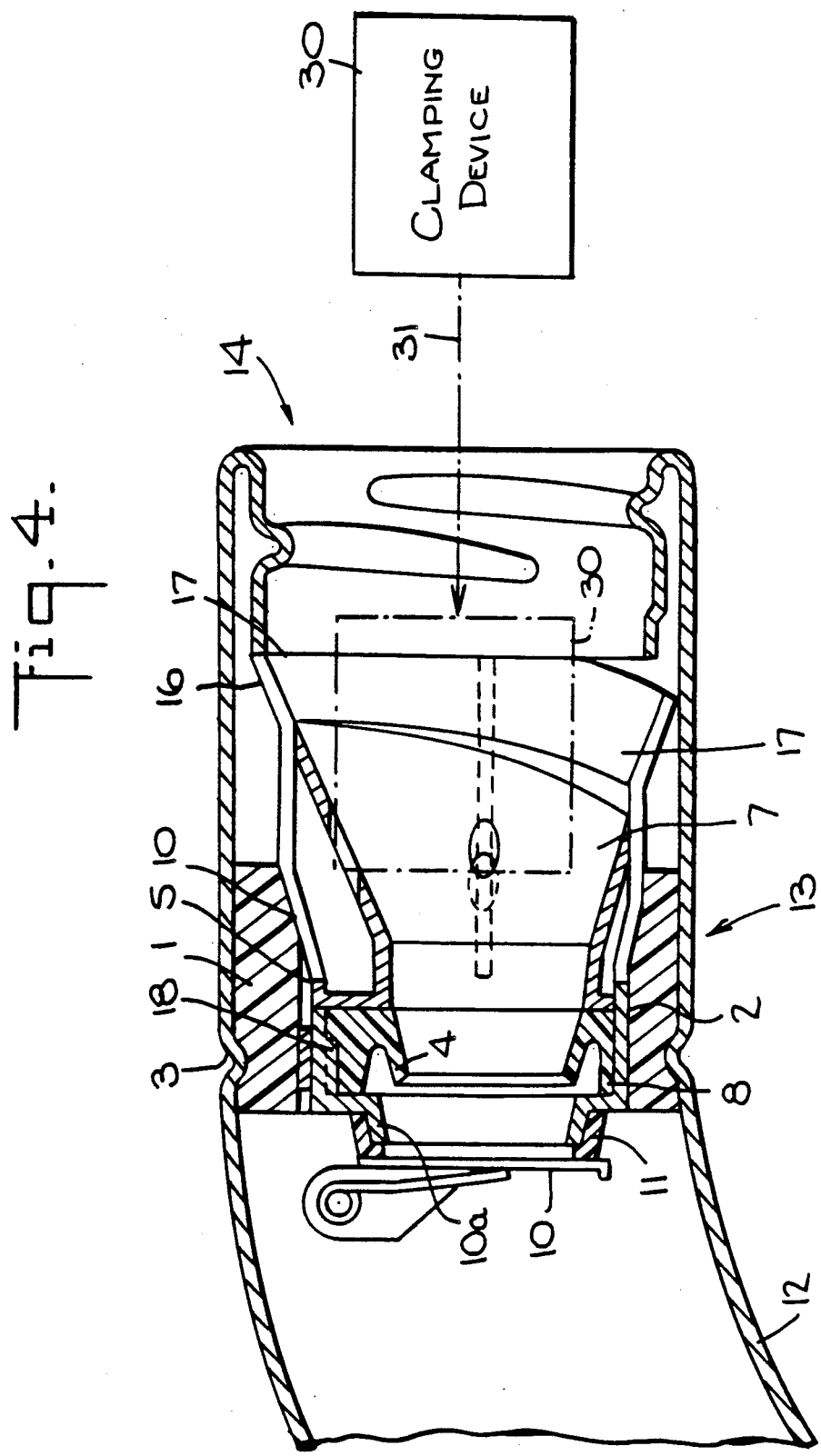

FUEL DISPENSER SEAL

The invention relates to a fuel dispenser seal.

BACKGROUND OF THE INVENTION

A fuel dispenser seal is known from the German utility model publication G 87 10859.3. The external diameter of the dispenser is significantly larger than the internal diameter of the orifice of the inlet. Hence, an installation through the orifice is not possible. This configuration rather requires that the fuel dispenser seal be inserted into the inlet from direction of the fuel tank, hence, it must be included in the manufacturing process of the inlet. This is not satisfactory insofar as the fuel dispenser seals which are being discussed here are only used in vehicles which are provided with a catalyzer engine. The use of such seals is dispensable in vehicles which are provided with a conventional combustion engine. Automobile manufacturers offering vehicles which are provided with a catalyzer as well as vehicles having a conventional engine are forced to have a supply of and to install two different embodiments of fuel tanks. The labor and costs involved are significant.

It is an object of the invention to create a fuel dispenser seal which permits supplementary installation of the seal without any problems whenever it is required.

In the fuel dispenser seal in accordance with the invention, the sealing ring is included in a supporting body of a basically tube-like configuration; the supporting body is at least in a partial section elastically configured and a reversible diameter reduction permits introducing the aforesaid body through the orifice into the inlet. The supporting body engages with the inlet via at least one projection facing in a radial direction towards the interior and can be made stationary in an axial direction. Consequently, the fuel dispenser seal in accordance with the invention can be installed subsequently to the manufacture of the fuel tank through the orifice of the inlet; making the supporting body stationary on a projection of the inlet facing in a radial direction towards the interior ensures an immovable, axial fixation in the inlet. This completely meets the present safety requirements and a standardized fuel tank can be used in any case.

The support body can be bipartite and include a flexible external ring which surrounds an internal ring made of an inflexible material. The internal ring has a smaller diameter than the orifice and the internal ring can be axially immovably attached to the external ring. In such a case, the external ring can be made of soft rubber and the internal ring of sheet metal or a hard plastic. This ensures on one hand a good sealing effect of the support body with respect to the inside wall of the inlet and, on the other hand, a good resistance of the support body with regard to the wear resulting from the contact with the fuel dispenser itself. Further, if necessary, it is also possible to produce an external ring from a soft rubber which swells when exposed to fuel. In this case, during use of the fuel dispenser in accordance with the invention, there is a stronger contact pressure of the external ring with the inflexible boundary surfaces surrounding each other in a radial direction on one side of the inlet and on the other side of the internal ring which strongly improves the sealing effect achieved. This is a great advantage, especially in cases where the boundary surfaces have certain surface irregularities which occur during manufacture, for example surface striae.

The external ring can be provided with a support surface facing the orifice. The support surface contacts the internal ring if the internal ring rises above the external ring with a hollow-conically-shaped connecting piece directed toward the orifice and if the connecting piece is provided with at least one longitudinally extending opening and can be engaged behind the part narrowing the orifice of the inlet. The internal ring is thus immovably attached in axial direction between the support surface of the external ring and the part narrowing the orifice of the inlet. Relative dislocations are thus completely excluded.

In such an embodiment, it is advantageous that the support surface be provided with an internal diameter extended in direction to the orifice of the inlet. Only in this case, there is a stress component directed radially towards the exterior during a radial contact pressure of the internal ring which ensures a firm contact of the external ring with the inside wall of the inlet and, as a consequence thereof, a particularly good axial attaching.

The projection of the inlet pointing towards the interior which firmly fixes the support body in axial direction can be configured annularly closed and, for example, can have the shape of a bead. As compared to this, it is less expensive to install an embodiment in which the projection is formed by at least two indentations uniformly distributed in circumferential direction which, for example, can have a calotte-like shape. The appertaining external ring of the fuel dispenser seal is on its external side advantageously provided with a surrounding groove in which the indentations can engage during installation.

The internal ring can be bipartite, including a seal holder and a closing link. The seal holder surrounds the sealing ring with an angular profile on the side of the fuel tank and facing radially towards the exterior and surrounds the closing link on the side facing towards the orifice; the seal holder and the closing link can immovably be connected to each other. The seal holder and the closing link thus form together a groove open to the inside in which the sealing ring can engage. The latter can, for example, have the shape of a conventional groove ring including a sealing lip axially projecting towards the fuel tank. After a possible wear has occurred, it can thus be more easily replaced.

The closing link can be made of a rigid material and have an internal diameter which is hollow-conically extending from the sealing in a direction towards the orifice. The smallest value of the internal diameter is basically identical with the internal diameter of the sealing ring in the section of the end facing the orifice. The sealing ring usually made of soft-elastic rubber is thus well protected against mechanical effects of the fuel dispenser while the latter is inserted or removed.

The closing link can be tube-like configured and snap in an undercut of the seal holder. In addition to the inexpensive manufacture, it can be more easily inserted and fits firmly.

The closing link can be provided with at least one axially projecting flexible tongue; the tongue can be firmly attached to the closing link by snapping into the undercut of the seal holder. Several flexible tongues are advantageously distributed in circumferential direction and each is provided with an aperture to axially hold a clamping device; the flexible tongues can be released from the undercuts of the seal holder by means of the clamping device. Replacing the seal which is possibly required is furthermore made easier. It is advantageous that the flexible tongues axially extend in direction towards the fuel tank. In such a configuration, they cannot interfere with the insertion and removal of the fuel dispenser.

SUMMARY OF THE INVENTION

In accordance with the invention, a fuel dispenser seal to be used in an inlet of a fuel tank having an orifice of a reduced diameter comprises a support body of a basically tube-like shape, and a sealing ring made of a polymeric material which is provided with a sealing lip which can engage with a fuel dispenser. The sealing ring is held in the support body of a basically tube-like shape and at least a portion of the support body is elastically configured for insertion into the inlet to the orifice by mean of a reversible diameter reduction. The inlet engages the support body with a projection of the inlet facing in a radial direction toward the interior and the support body is firmly attached in axial direction.

For a better understanding of the invention, together with other and further objects thereof, reference is made to the following description, taken in connection with the accompanying drawings, and its scope will be pointed out in the appended claims.

BRIEF DESCRIPTION OF THE DRAWINGS

Referring now to the drawings:

FIG. 1 is a longitudinal cross-sectional view of a representative embodiment of the fuel dispenser seal in accordance with the invention in an inlet of a fuel tank;

FIG. 2 is an end view through the inlet and;

FIG. 3 is an exploded sectional view of the FIG. 1 fuel dispenser seal and inlet of a fuel tank; and FIG. 4 is a longitudinal cross sectional view of the FIG. 1 embodiment also diagrammatically representing a clamping device for use therewith.

Referring now to FIGS. 1 and 2, the fuel dispenser is to be used with an inlet 12 of a fuel tank having a reduced orifice diameter. The inlet 12 has a sealing ring 8 of polymeric material which is provided with a sealing lip 4 which can engage with the fuel dispenser. The sealing ring 8 is included in a support body 13 of a basically tube-like shape; the support body 13 is bipartite and includes an external ring 1 made of a flexible soft rubber and an internal ring 2 surrounded thereby and made of a rigid material, which preferably is sheet metal in the present embodiment. In the section of the axial extension of the external ring 1, the internal ring 2 has a smaller diameter than the orifice 14 of the inlet 12. The inlet 12 has an annular portion in the section of the indentations 3 of the inlet 12 and continuously contacts the inside of the external ring 1. An axial relative dislocation of the external ring 1 with respect to the inlet 12 is thus excluded.

Continuing in direction toward the orifice, the external ring 1 and the internal ring 2 contact each other in the area of support surface conically extended in direction towards the orifice. During an axial contact pressure of the internal ring 2 with the external ring 1 the latter is pressed, via the support surface, in radial direction against the inside wall of the inlet 12; this improves the good sealing effect.

The internal ring 2 made of sheet metal rises above the external ring 1 made of a swelling material, for example, soft rubber which swells when exposed to fuel. The internal ring 2 has a hollow conically extended connection piece directed toward the orifice 14. The connection piece has four longitudinally extending openings 16 uniformly distributed in circumferential direction and snapped in behind the part of the inlet narrowing the orifice. This excludes also almost completely a relative dislocation of the internal ring 2 in direction towards the orifice. Also, a portion of the element 2 engages the conical portion 10a of the support body 13, thus immovably positioning the element 2 in the direction of the fuel tank.

The internal ring 2 is also bipartite and includes a seal holder 18 and a closing link 7. The seal holder 18 surrounds the sealing ring on the side of the fuel tank and the side radially directed toward the exterior with an angular profile. The seal holder 18 surrounds the closing link 7 on the side facing the orifice 14. The seal holder 18 and the closing link 7 are immovably attached to each other. The sealing ring 8 configured as a groove ring is thus retained in a groove open towards the inside during the intended use of the fuel dispenser in accordance with the invention. Replacing procedures after wear are thus performed more easily. Portion 17 is a portion of the closing link 7 extending away from the fuel tank.

The closing link has an internal diameter conically extended from sealing ring 8 in a direction toward the orifice 14 of the inlet 12; the smallest value of the internal diameter is basically identical with the internal diameter of the sealing ring 8 in the area of the end facing the orifice 14. During the intended use of the fuel dispenser seal, the sealing ring is thus particularly well protected in the fuel dispenser which improves the service life. To attach the closing link 7 to the seal holder the link is provided with three flexible tongues 5 axially protruding in a direction toward the fuel tank; to firmly attach the flexible tongues 5 to the seal holder 18 they can be snapped in the corresponding undercuts of the latter. The flexible tongues are provided each with a respective aperture 6 so as to be able to axially insert a clamping device by means of which said tongues can also be released from the undercuts of the seal holder. The clamping device is represented diagrammatically in FIG. 4 as a device 30 which can be moved into position represented in phantom and as represented by the arrow 31. Following this, the closing link can be axially removed from the seal holder and then the actual sealing ring 8. After inserting a new sealing ring the closing link and the seal holder can be joined again in the reverse order.

In the represented embodiments, the internal ring 2 is provided with what is referred to as the unleaded fuel flap 10 which is, by means of a spring, pressed against against the end of the fuel dispenser seal facing towards the inside when the fuel dispenser is not inserted. The end is provided with a sealing ring 11 made of a rubber elastic material which never is exposed to effects caused by the fuel dispenser itself. A change of the sealing effect is not expected even during a long-term use and an escape of fuel vapor through the inlet is almost completely excluded. The oblique dot-dash lines in FIG. 1 represent the axes and offset of inwardly projecting portions of the orifice 14.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. The combination of a fuel dispenser seal and an inlet of a fuel tank having an orifice of a reduced diameter comprising: an inlet of a fuel tank having an orifice of a reduced diameter and having a radial direction and an axial direction and having a projecting portion facing in the radial direction of the orifice inwardly of the orifice, a hollow, elongated support body, and a sealing ring made of a polymeric material which is provided with a sealing lip which can engage with a fuel dispenser, the sealing ring being held in the support body and at least a portion of the support body being elastically configured for insertion into the inlet through the orifice by means of an elastic diameter reduction and said inlet engaging the support body with the projecting portion of the inlet facing in the radial direction of the orifice inwardly of the orifice and the support body being firmly attached in the axial direction of the orifice.

2. The combination in accordance with claim 1, in which the support body is bipartite and comprises an external ring made of a flexible material and an internal ring made of an inflexible material surrounded by said external ring and in which the internal ring has a smaller diameter than the orifice and in which the internal ring is axially immovably disposed with respect to the external ring.

3. The combination in accordance with claim 2, in which the external ring is made of soft rubber and the internal ring of sheet metal.

4. The combination in accordance with claim 2, in which the external ring is provided with a support surface facing the orifice and in contact with the internal ring, in which the internal ring rises above the external ring with a conically extended connected portion directed toward the orifice and in which the connection portion is provided with at least one longitudinally extending opening and can be snapped in behind the inlet.

5. The combination in accordance with claim 4, in which the support surface is provided with a conically extended internal diameter directed towards the orifice.

6. The combination in accordance with claim 1, in which the projection is formed by at least two indentations of the inlet which are uniformly distributed in circumferential direction.

7. The combination in accordance with claim 2, in which the internal ring is bipartite and encloses a seal holder and a closing link having a side facing towards the orifice, in which the sealing ring has a side adapted to be facing a fuel tank and a side adapted to be facing radially towards an exterior and in which the seal holder surrounds the sealing ring on the side adapted to be facing the fuel tank and the side adapted to be facing radially towards the exterior with an angular profile and surrounds the closing link and in which the seal holder and the closing link are immovably attached to each other.

8. The combination in accordance with claim 7, in which the closing link has an internal diameter conically extended from the sealing ring in direction toward the orifice and in which the sealing ring has an end facing towards the orifice and in which the smallest value of the internal diameter of the conically extended closing link is substantially identical with the internal diameter of the sealing ring in the area of the end facing towards the orifice.

9. The combination in accordance with claim 8, in which the closing link has a tube-like configuration and can be snapped in the seal holder.

10. The combination in accordance with claim 9, in which the closing link has at least one axially projecting flexible tongue and the closing link can be firmly attached to the seal holder by snapping the at least one flexible tongue in said seal holder.

11. The combination in accordance with claim 10, which includes a clamping device and which includes several flexible tongues distributed in circumferential direction around the closing link and each tongue is provided with at least one aperture for axial insertion of the clamping device and in which the at least one of said several flexible tongues can be released from the seal holder by means of the clamping device.

12. The combination in accordance with claim 11, in which the flexible tongues are axially disposed in direction toward the fuel tank.

* * * * *